Sept. 6, 1927.
C. J. ROBERTS
1,641,866
CORE TUBE CUTTER
Filed July 24, 1925
5 Sheets-Sheet 1
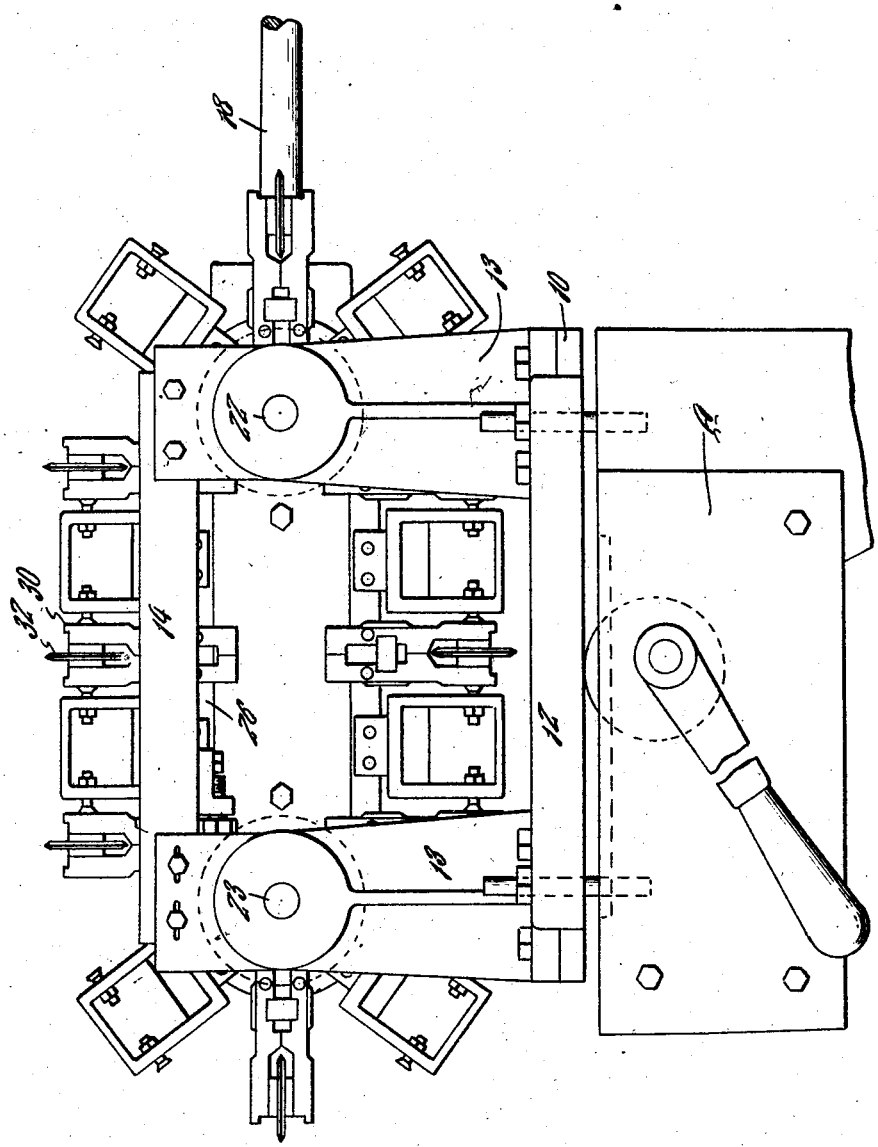

Sept. 6, 1927.  
C. J. ROBERTS  
CORE TUBE CUTTER  
Filed July 24, 1925
1,641,866
5 Sheets-Sheet 2
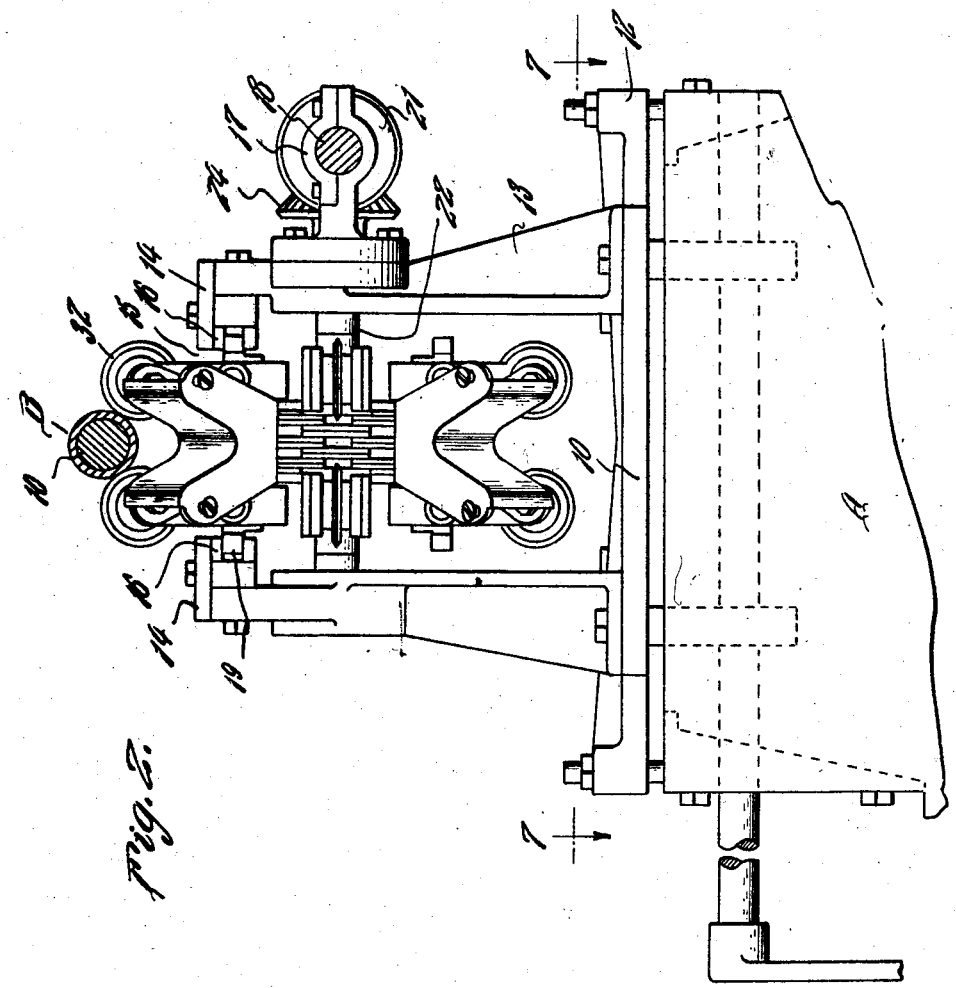

Sept. 6, 1927.
C. J. ROBERTS
CORE TUBE CUTTER
Filed July 24, 1925
1,641,866
5 Sheets-Sheet 3
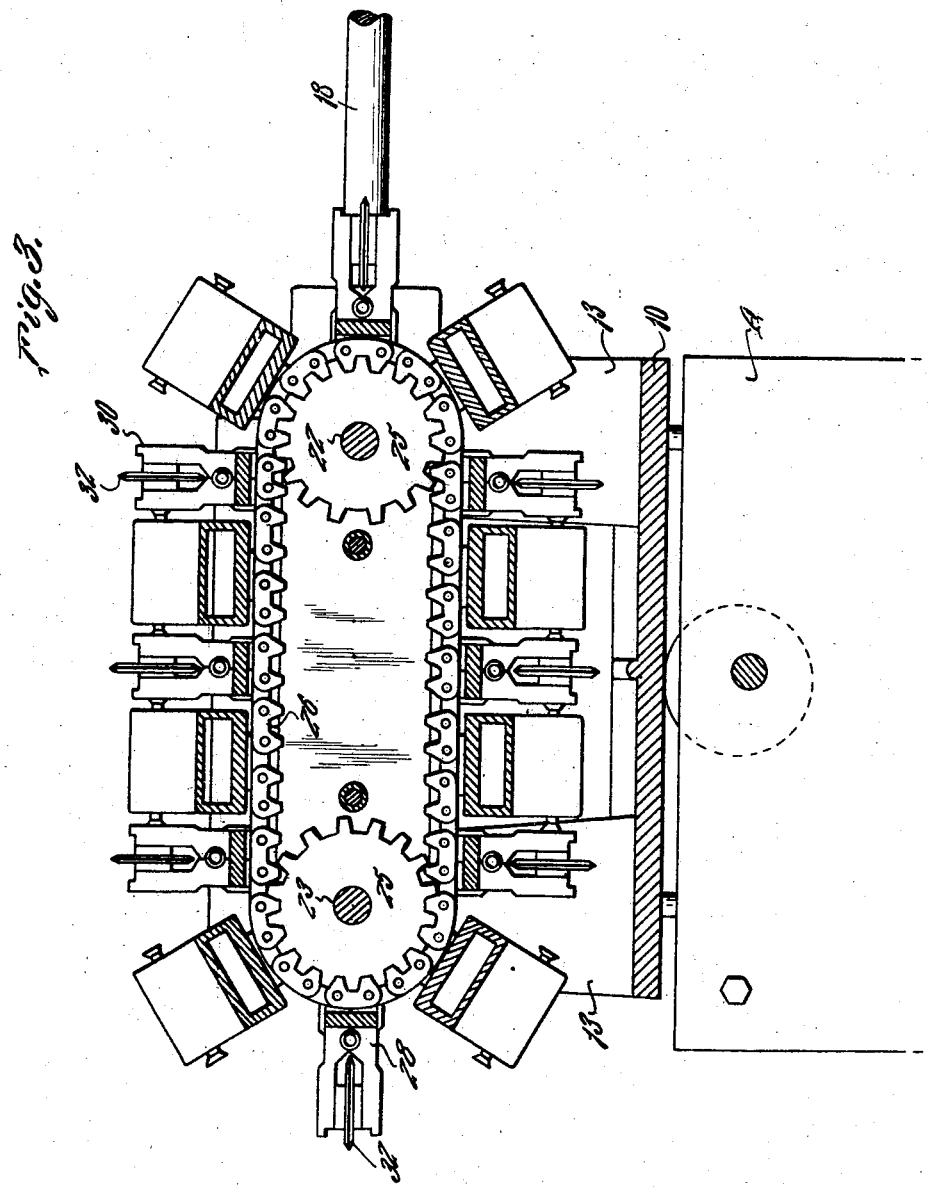

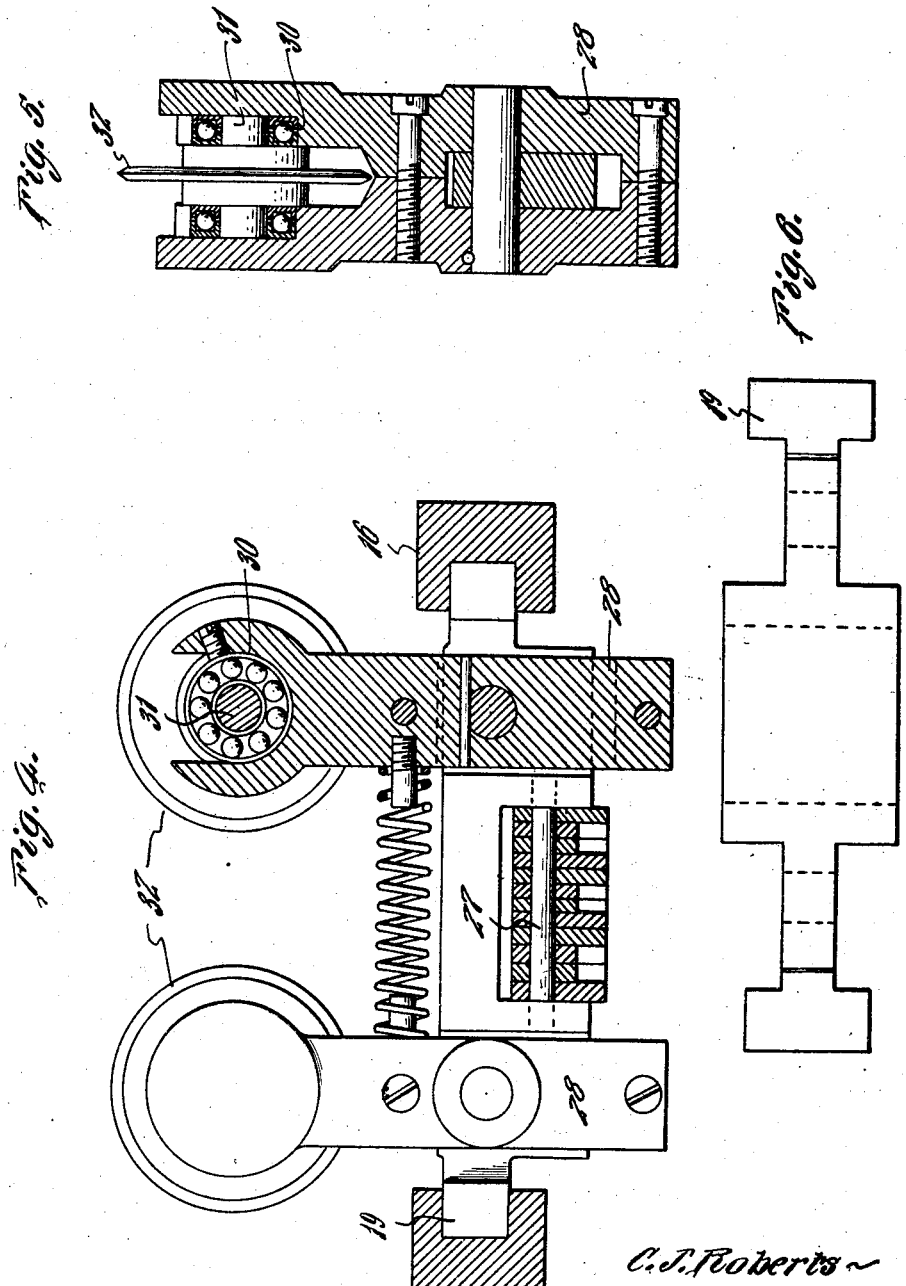

Sept. 6, 1927.  C. J. ROBERTS  1,641,866
CORE TUBE CUTTER
Filed July 24, 1925   5 Sheets-Sheet 5
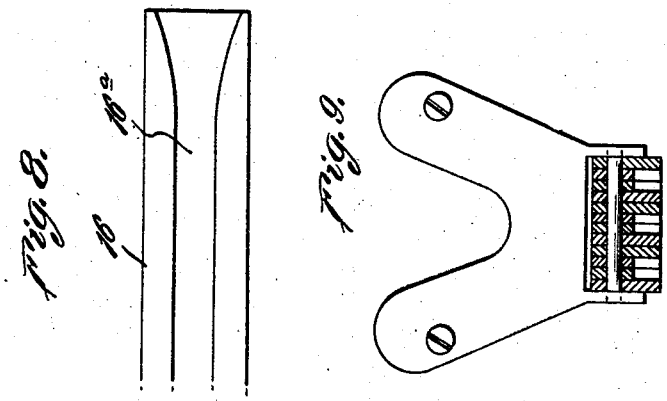
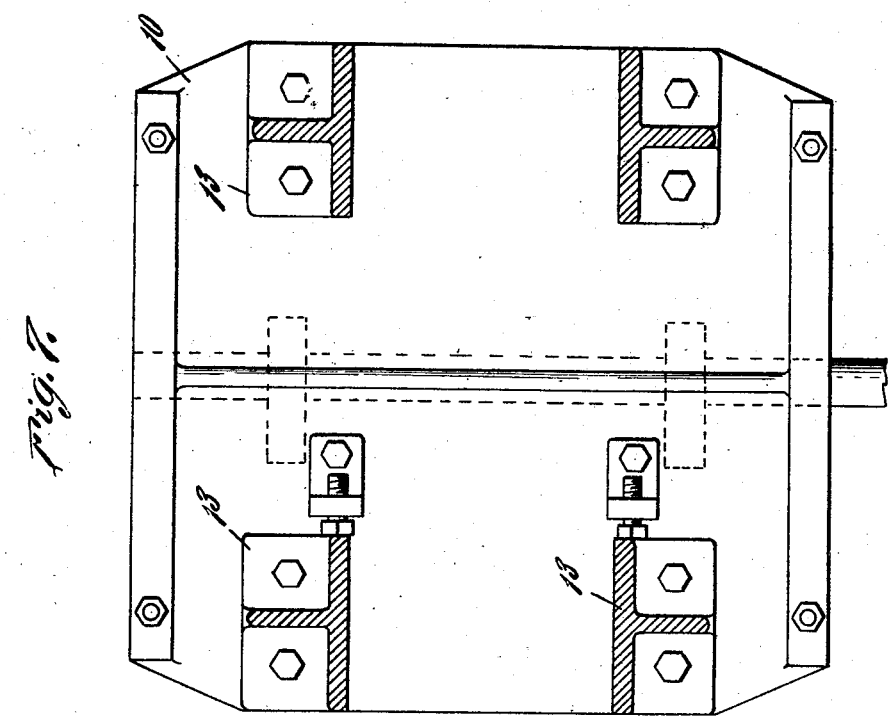
C. J. Roberts
INVENTOR
BY Victor J. Evans
ATTORNEY Patented Sept. 6, 1927.

1,641,866

UNITED STATES PATENT OFFICE.

CHESTER J. ROBERTS, OF MILWAUKEE, WISCONSIN, ASSIGNOR TO NORTHERN PAPER MILLS, OF GREEN BAY, WISCONSIN.

CORE-TUBE CUTTER.

Application filed July 24, 1925. Serial No. 45,914.

This invention relates to means for cutting cardboard or other tubing into sections, and has for its object the provision of a novel machine designed primarily to be used in connection with a spiral core tube making machine and driven thereby whereby to automatically cut the tube into any number of sections of desired length.

It is well known in the art that the usual mechanism for cutting such tube involves the use of a circular rotary saw which has the great disadvantage of leaving the cut tube with ragged edges which must be dressed off by a subsequent operation, this disadvantage resulting in a great loss of time, the services of one or more additional operators, and also a waste in the material.

It is with the above facts in view that I have designed the present machine which embodies the use of rotary disk cutters which are driven by the rotary movement imparted to the spiral tube itself, means being provided for applying pressure to the cutting disks so that they will sever the tube.

A more specific object is the provision of a machine of this character which is adjustable whereby it may be used for cutting the tube into sections of different lengths depending upon the use to which the sections are to be put.

The invention further contemplates the provision of various details of construction and arrangement which will insure proper and speedy operation of the mechanism.

An additional object is the provision of a cutting machine of this type which will be comparatively simple and inexpensive in manufacture, easy to control, positive in action, efficient and durable in service, and a general improvement in the art.

With the above and other objects and advantages in view, the invention consists in the details of construction to be hereinafter more specifically described and claimed, and illustrated in the accompanying drawings, in which:

Figure 1 is a side elevation of the complete machine showing it associated with a portion of a spiral tube making machine.

Figure 2 is an end view of my device,

Figure 3 is a longitudinal section,

Figure 4 is a detail cross section,

Figure 5 is a detail sectional view through one of the cutter carrying arms,

Figure 6 is a detail view,

Figure 7 is a section on the line 7—7 of Fig. 2,

Figure 8 is a detail view of a guide,

Figure 9 is a detail view of one of the cutter disk supports.

Referring more particularly to the drawings, the letter A designates a portion of a machine used in the making of spiral tubing such as that indicated by the letter B. The diameter and exact manufacture of the tubing form no part of the present invention as my device is capable of use in connection with tubing of different sizes. Only a portion of the tube making machine is illustrated, as it likewise forms no part of the present invention.

In connection with the machine A, I provide a supporting shaft 10 which extends within the tubing B and which is driven by any suitable means, not shown, whereby to impart comparatively rapid rotary movement to the tube after it leaves the machine. In constructing my device, I make use of a supporting structure including a base 12 from which rise uprights 13 which support plate members 14 constituting a platform or table having a longitudinal opening or slot 15 at the sides of which are mounted channeled guides 16 having flaring ends 16ª and which are designed to have a cam action in a manner which will be described hereinafter. One upright 13 at one side of the device is provided with a bearing 17 within which is journaled the drive shaft 18 which may be driven by any desired means, not shown. On the shaft 18 is a bevel gear 21 for a purpose to be described.

Journaled through the uprights 13 and arranged in spaced parallel relation are transverse shafts 22 and 23, the former of which carries a bevel gear 24 meshing with the gear 21 so that the movement of the drive shaft will be imparted to one of the transverse shafts. Secured on the shafts 22 and 23 are sprockets 25 of a suitable type designed to drive a roller chain 26 which is preferably of the Morse or Whitney type. By adjustably mounting the uprights 13 upon the base 12 it is apparent that they may be moved closer together or farther apart so as to permit the use of chains of different lengths, if such should be desired for any reason, though this feature is not illustrated as it is an obvious expedient.

Pivotally mounted upon the chains 26 at spaced points are pairs of arms 28 normally urged apart by springs 29. The arms are provided with lugs 19 which ride within the guide 16 for forcing the arms together.

The free ends of the arms 28 are formed with bearings 30 within which are journaled shafts 31 carrying cutting disks 32 of any preferred type and size. The shaft 10 carrying the tube B is so arranged as to extend longitudinally of my device above the table or platform 14 thereof and in position to be engaged by the pairs of disks 32 which are carried and moved by the chain at the same speed with which the tube is fed to the device from the manufacturing machine.

In the operation it will be seen that the chain 26 moves by virtue of the rotation of the sprocket 25 driven by the shaft 18, the lugs 19 on the successive parts of pivoted arms 28 are brought into engagement with inclined inner surfaces of the guide members 16 which operate to force the arms of each pair toward each other so that they will engage the tube B. As the tube B is rotated with the driven shaft 10, it is apparent that the engagement of the tube with the cutting disks will impart rotary movement to the latter while they are being pressed into engagement with the tube by the inclined wedge member. The result is that the pairs of disks will operate to cut the tube B into sections of any desired length depending upon the distance between the successive pairs of disks. Owing to the fact that the shaft 10 extends through and supports the tube, it is quite obvious that it forms a substantial bearing which will prevent the formation of jagged or ragged edges when the sections of the tube are severed. In this way, it is quite apparent that there will be no roughness which will need to be removed by a subsequent operation as is true in the ordinary method of cutting the tube. As soon as the arms 28 pass by the inclined wedge members 16, it is quite evident that the springs 29 will operate to force the arms apart so that the disks carried thereby will be out of engagement with the tube.

From the foregoing description and a study of the drawings it will be apparent that I have thus provided a simple machine which will very efficiently operate to cut a tube of chip or straw board or in fact any other similar material into uniform sections of any desired length suitable for use, as cores for rolls of paper of any kind, mailing tubes, cylindrical shells, cereal boxes and the like. A great advantage is the leaving of an absolutely smooth surface or edge at both ends of each section cut off so that the appearance will be neat and finished. It is not necessary that all the pairs of disks be the same distance apart as they might be differently spaced in order that sections of different length may be cut by the one machine. If is desired, however, the arms might be mounted upon the supporting chain 26 that they could be adjusted different distances apart for varying the length of the cut sections. It is also to be observed that it makes no difference what the diameter of the tube may be as the operating wedges might be shifted away from the slot so as to decrease the throw of the pivoted arms in case it is desired to cut tubes of relatively large diameter.

While I have shown and described the preferred embodiment of the invention, it is of course to be understood that I reserve the right to make such changes in the form, construction and arrangement of parts as will not depart from the spirit of the invention or the scope of the subjoined claims.

Having thus described my invention, I claim:

1. In a core tube cutter, a stationary frame, an endless member movably mounted within the frame, means for moving said member, means for supporting a core tube to be cut, a plurality of transverse members carried by said endless member, a pair of arms movably mounted on each of said transverse members and normally urged apart, and cam tracks located at opposite sides of the endless member and engageable by said transverse members for moving said arms toward each other, said arms carrying cutting blades.

2. In a core tube cutting machine, a supporting frame, means for supporting a tube to be cut, an endless member movably mounted within the frame, means for driving said endless member, a plurality of transverse members carried by said endless member, a pair of arms pivoted upon each of said transverse members, spring means normally urging said arms apart, and oppositely arranged cam tracks engageable by said transverse members for swinging the arms toward each other into cutting relation to the core tube.

3. A core tube cutting device comprising a supporting structure, a member movably mounted therein, means for driving said member, cutters carried by said movable member, means for periodically bringing said cutters into engagement with the tube, the cutters being formed as disks carried by pivoted arms, and springs normally urging said arms apart.

4. A core tube cutting device comprising a shaft for supporting the tube, a support, an endless member movably mounted within the support and means for driving the endless member, pairs of arms pivotally mounted upon said endless member and normally held apart, cutting disks carried by said arms and cam means engageable by the arms during movement of the endless member whereby to bring the disks into engagement with said tube.

5. A core tube cutter comprising a driven shaft for supporting a tube, a supporting structure including a table member, having a longitudinal slot therein, shafts journaled in said supporting structure and carrying sprockets, means for driving one of said shafts, a chain trained about both sprockets, pairs of arms pivoted upon said chain and carrying rotatably mounted cutting disks, means normally holding said arms in spaced relation, said arms travelling along said slot, and means on the table engageable by the arms whereby to force the disks thereon into engagement with the tube.

6. A core tube cutting machine comprising a driven shaft about which a tube is disposed a supporting structure including a table member having a longitudinal slot therein, shafts journaled in said supporting structure and carrying sprockets, means for driving one of said shafts, a chain trained about both sprockets, pairs of arms pivoted upon said chain and carrying rotatably mounted cutting disks, means normally holding said arms in spaced relation, said arms travelling along said slot, means on the table engageable by the arms whereby to force the disks thereon into engagement with the tube, said means comprising inclined elements against which said arms engage.

7. In a core tube cutting apparatus, a driven supporting shaft for the tube, a supporting structure, a pair of shafts journaled in said supporting structure and carrying sprockets, a chain trained about said sprockets, a third shaft having a gear connection with one of said pair of shafts, means for driving said third named shaft, arms arranged in pairs and pivoted upon said chain, springs normally holding said arms apart, cutting disks rotatably mounted upon said arms, and inclined wedge members carried by the supporting structure and engageable by the outer edges of the arms whereby to force the disks into engagement with said tube to effect severing thereof.

In testimony whereof I affix my signature.

CHESTER J. ROBERTS.